United States Patent
Rye

(10) Patent No.: US 11,540,499 B1
(45) Date of Patent: Jan. 3, 2023

(54) LURE WITH OSCILLATING BLADE

(71) Applicant: Ryan Patrick Rye, Suwanee, GA (US)

(72) Inventor: Ryan Patrick Rye, Suwanee, GA (US)

( * ) Notice: Subject to any disclaimer, the term of this patent is extended or adjusted under 35 U.S.C. 154(b) by 150 days.

(21) Appl. No.: 17/173,653

(22) Filed: Feb. 11, 2021

(51) Int. Cl.
*A01K 85/14* (2006.01)
*A01K 85/10* (2006.01)
*A01K 85/02* (2006.01)

(52) U.S. Cl.
CPC .............. *A01K 85/14* (2013.01); *A01K 85/02* (2013.01); *A01K 85/10* (2013.01)

(58) Field of Classification Search
CPC ........ A01K 85/14; A01K 85/02; A01K 85/10; A01K 85/00
USPC ........................................ 43/42.12
See application file for complete search history.

(56) References Cited

U.S. PATENT DOCUMENTS

| | | | | |
|---|---|---|---|---|
| 5,461,819 A * | 10/1995 | Shindledecker | ....... | A01K 85/14 43/42.22 |
| 5,887,378 A * | 3/1999 | Rhoten | ................... | A01K 85/14 43/42.23 |
| 7,627,978 B2 * | 12/2009 | Davis | ..................... | A01K 85/18 43/42.49 |
| 8,656,633 B2 * | 2/2014 | Renosky | ................ | A01K 85/00 43/42.22 |
| 8,973,298 B2 * | 3/2015 | Thorne | ................... | A01K 85/00 43/42.15 |
| 10,477,845 B1 * | 11/2019 | Davis | ..................... | A01K 85/02 |
| 10,834,909 B1 | 11/2020 | Rye | | |
| 10,932,456 B2 * | 3/2021 | Schwartz | ............... | A01K 85/18 |
| 11,160,261 B1 * | 11/2021 | Dickerson | .............. | A01K 83/00 |
| 11,206,819 B1 * | 12/2021 | Rye | .......... | A01K 95/00 |
| 11,350,616 B2 * | 6/2022 | Kovacs | ................... | A01K 85/02 |
| 2009/0211145 A1 * | 8/2009 | Thorne | ................... | A01K 85/00 43/43.15 |
| 2010/0199542 A1 * | 8/2010 | Davis | ..................... | A01K 85/14 43/4.5 |
| 2013/0047491 A1 * | 2/2013 | Davis | ..................... | A01K 85/14 43/42.49 |
| 2015/0007483 A1 * | 1/2015 | Thorne | ................... | A01K 85/16 43/42.39 |
| 2016/0235049 A1 * | 8/2016 | Thorne | ................... | A01K 91/04 |
| 2016/0338329 A1 * | 11/2016 | Thorne | ................... | A01K 85/18 |
| 2017/0099822 A1 * | 4/2017 | Thorne | ................... | A01K 85/14 |
| 2019/0045764 A1 * | 2/2019 | Gibson | ................... | A01K 85/18 |
| 2019/0133099 A1 * | 5/2019 | Ostruszka | .............. | A01K 85/14 |

* cited by examiner

*Primary Examiner* — Christopher P Ellis

(57) ABSTRACT

A fishing lure is comprised of a blade member that is pivotably and slidably coupled to a two-leg wire form member. The first leg of the wire form member passes through a first aperture in the blade member, while the second leg of the wire form member passes through a second aperture in the blade member. The blade member is supported by the wire form member at solely the first and second aperture locations. If desired, the blade member can be removed and replaced without needing to bend the blade member. The lure remains in a generally upright position and the blade member exhibits a rapid oscillating movement as the lure is pulled forward in water.

20 Claims, 4 Drawing Sheets

LURE WITH OSCILLATING BLADE

BACKGROUND INFORMATION

Common "bladed jig" fishing lures feature oscillating blades pivotably mounted to a small wire eyelet exiting a lure body, with the wire loop passing through either a single mounting hole or multiple mounting holes of the blade. A disadvantage of these is that the blade does not effectively transmit its side-to-side motion to the body of the lure. That is, the head and body do not also substantially pivot side-to-side in a lifelike manner as the blade oscillates. Another disadvantage with existing bladed jig lures is that the fishing line is typically coupled directly to the pivoting blade member, which has a disadvantage of providing a hinged, and not direct, link between the fishing line and the hook point when an angler sets the hook.

A much more lifelike lure would be one wherein the blade member transmits its oscillating motion to a larger wire frame, with the larger wire frame then transmitting that rocking motion more effectively and in a more lifelike manner to the head and any trailer attached to the hook. In addition, having the fishing line coupled directly to the wire frame results in a rigid, and not pivoting, connection between the fishing line and hook, which helps increase the chance a biting fish will become hooked when the angler pulls on the fishing line.

SUMMARY OF THE INVENTION

A fishing lure is comprised of a blade member pivotably coupled to a wire frame through two apertures. A first leg of the wire frame passes through a first aperture, while a second leg of the wire frame passes through a second aperture. The shape of the wire frame prevents the blade member from sliding off the wire frame in a rearward direction, yet the wire frame still enables the blade member enough freedom to oscillate back and forth as the lure is retrieved.

Figure 1A:
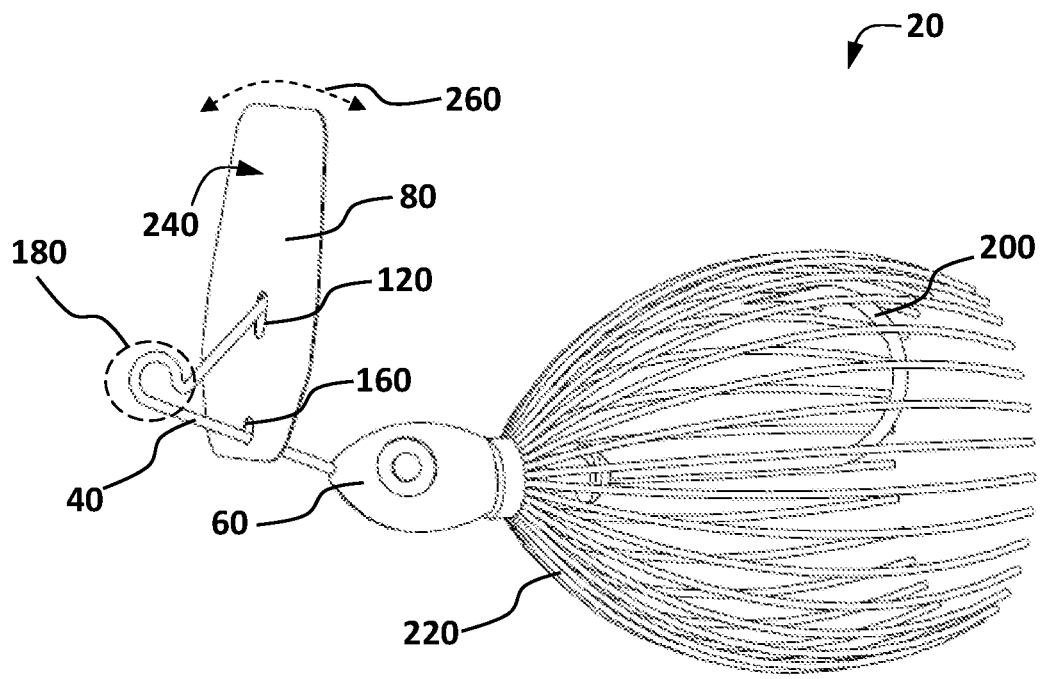
FIG. 1A is a diagrammatic perspective view of a first preferred embodiment of a lure with oscillating blade, in accordance with the present invention.

REFERENCE NUMERALS 20 lure
40 wire form member
60 body member
80 blade member
100 first leg
120 first aperture
140 second leg
160 second aperture
180 eyelet portion
200 hook
220 skirt
240 first side face
260 pivot angle
280 opposite side face
300 first leg bend
320 terminal end
340 minimum eyelet gap
360 second aperture spacing distance
380 upper half
400 lower half
420 cap
440 curved portion

DETAILED DESCRIPTION OF PREFERRED EMBODIMENTS

FIGS. 1A-1D show the details of a first preferred embodiment of a lure 20 comprised of a generally V-shaped wire form member 40 coupled to a body member 60, with a blade member 80 pivotably coupled to the wire form member 40 through two apertures. More precisely, a first leg 100 of the wire form member 40 passes through a first aperture 120, while a second leg 140 of the wire form member 40 passes through the second aperture 160. An eyelet portion 180 is located between the first leg 100 and second leg 140 for the attachment of a fishing line thereto, while a hook 200 extends rearward from the body member 60. The eyelet portion 180 prevents the fishing line knot from sliding up the first leg 100 and becoming stuck against the blade member 80, and the portion is generally characterized by an almost-complete loop that ends with a sharp acute angle bend that marks the beginning of the first leg 100. An elastomeric skirt 220 is attached to the body member 60 and helps disguise the hook 200. The blade member 80 has a first side face 240, and is pivotably coupled to the wire form member 40 such that the blade member 80 is free enough to rotate forward and back through a pivot angle 260 of at least 5 degrees, with the pivot angle rotation occurring about an axis that is perpendicular to the median plane of the lure 20. Ideally the blade member 80 is made of a thin rigid metal material, however plastic materials also can work provided that those materials are not flexible. Flexible blade materials, when their rear face or rear surface is unsupported by the wire form member, can bend rearward from the hydrodynamic pressure of the surrounding water as the lure is pulled forward and undesirably affect the action of the lure.

Figure 1B:
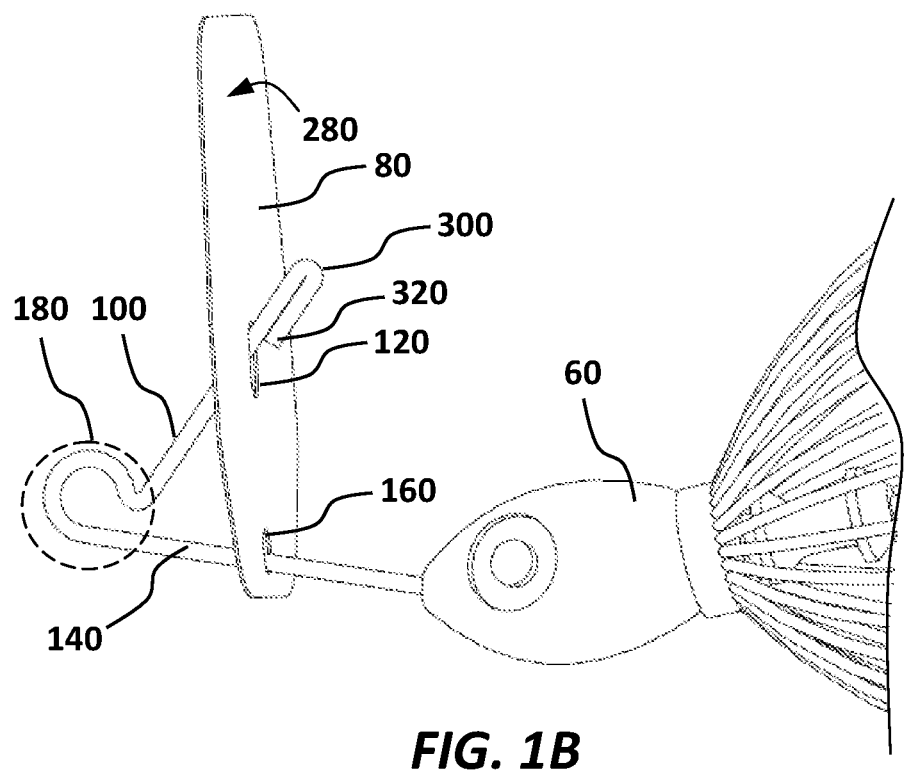
FIG. 1B is an enlarged diagrammatic perspective view of the front portion of the first preferred embodiment.

FIG. 1B shows additional details within the area behind the blade member 80. The opposite side face 280 of the blade member 80 is clearly visible. The first leg 100 comprises a first leg bend 300 just prior to its terminal end 320, and the bend is in a direction towards the body member 60 and not up towards the top of the blade member 80. The purpose of this first leg bend 300 is to prevent any sharp edge or burr on the terminal end 320 from contacting the finger of an angler.

Figure 1C:
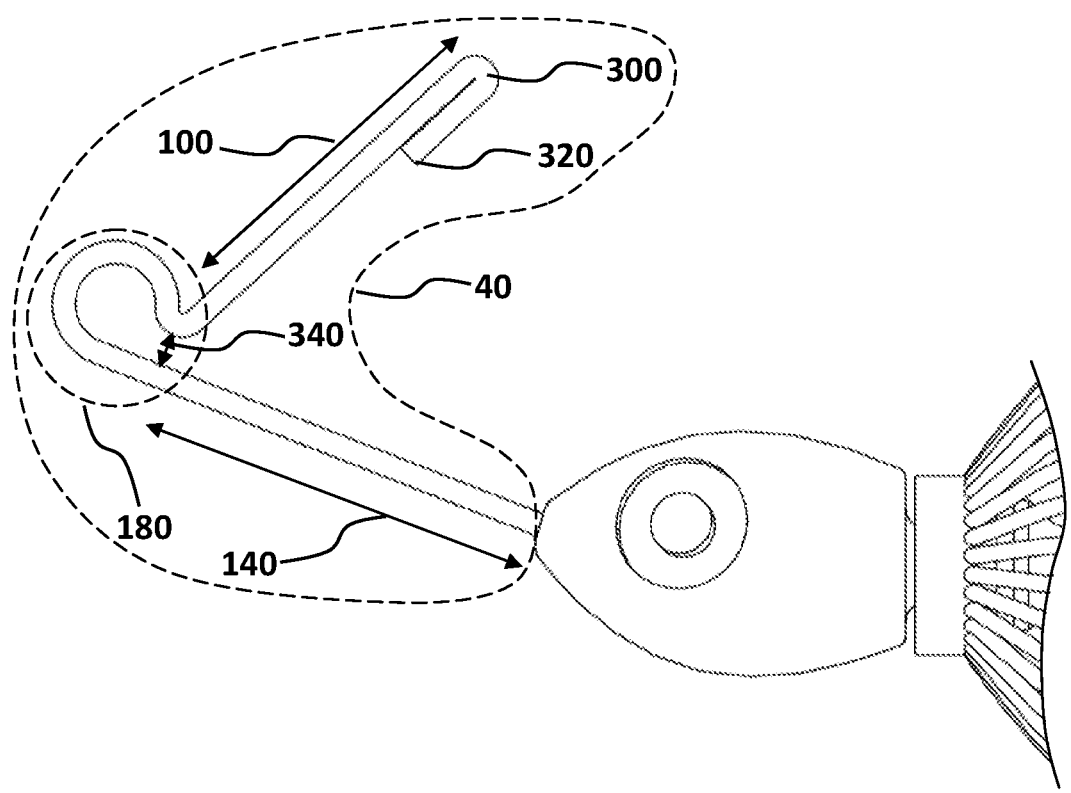
FIG. 1C is an enlarged diagrammatic side view of the front portion of the first preferred embodiment, with the blade member removed.
Figure 1D:
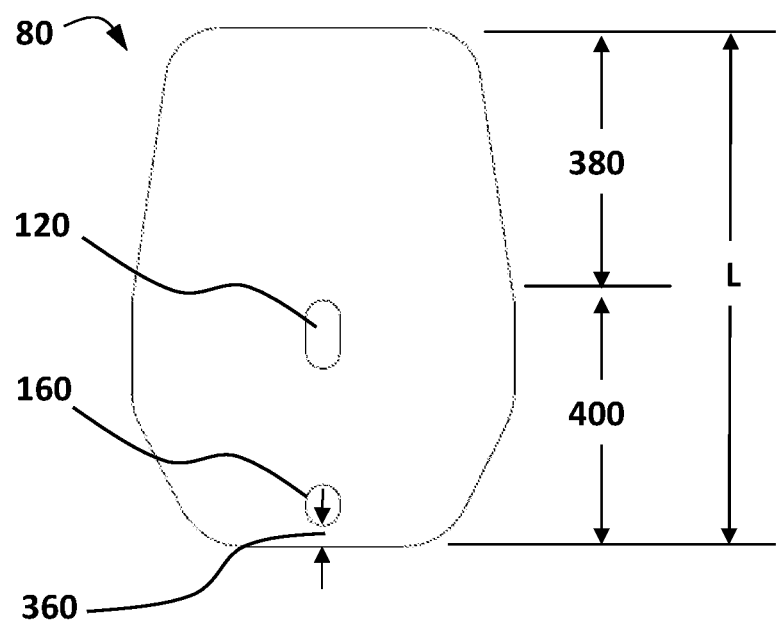
FIG. 1D is a diagrammatic front view of the first side face of the blade member of the first preferred embodiment.

FIGS. 1C and 1D detail additional features enabling the attachment of the blade member 80. In FIG. 1C, a minimum eyelet gap 340 can be defined as the shortest distance between the second leg 140 and the beginning of the first leg 100 occurring within the eyelet portion 180. In FIG. 1D, the first aperture 120 and second aperture 160 are more clearly visible, with the first aperture 120 having an elongated shape. A second aperture spacing distance 360 is shown, and it can be defined as the minimum distance between the bottom edge of the blade member 80 and the edge of the second aperture 160. Additionally, the overall length L of the blade member 80 can be divided into two equal-length portions: an upper half 380 and a lower half 400, with the second aperture 160 clearly located in the lower half 400.

Figure 2A:
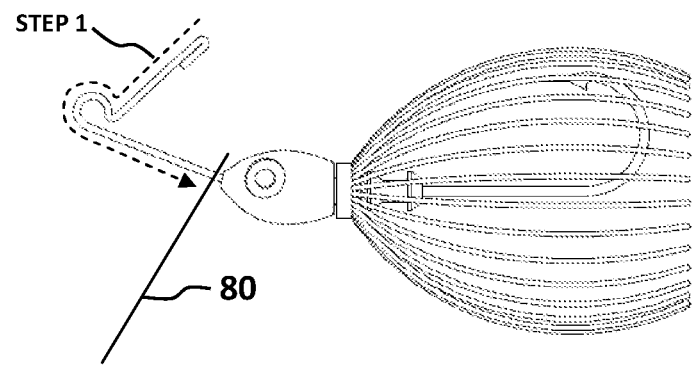
FIGS. 2A-2C are diagrammatic side views of the first preferred embodiment illustrating how a rigid blade member can be assembled to the wire form member.
Figure 2B:
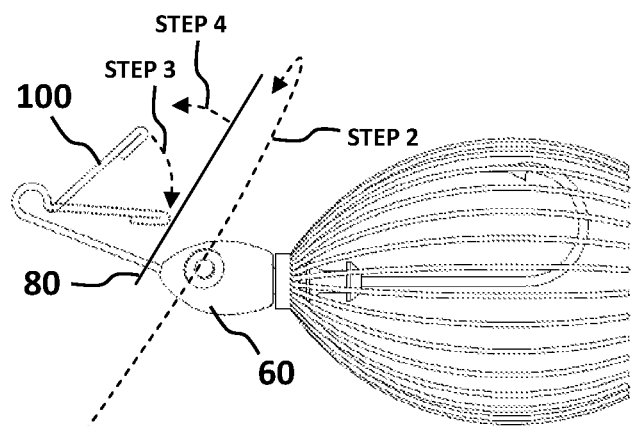
Figure 2C:
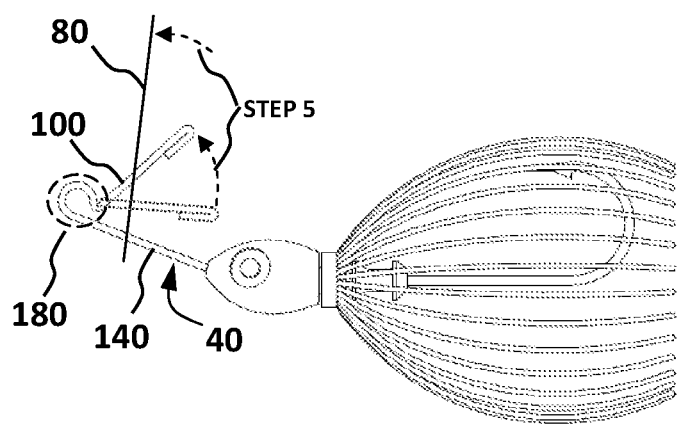

FIGS. 2A-2C illustrate the assembly steps for attaching the rigid blade member 80 onto the wire form member 40. Beginning with FIG. 2A, the blade member 80 first slides down the first leg 100 via the second aperture 160 and slides past the eyelet portion 180 with its minimum eyelet gap 340. Sliding past the eyelet portion 180 is possible because the second aperture spacing distance 360 is smaller than the minimum eyelet gap 340. The blade member 80 ends this STEP 1 by hanging upside down adjacent to the body member 60. Next in STEP 2, the blade member 80 is rotated 180 degrees to a more vertical position in order to align the first aperture 120 behind the first leg 100. For STEP 3, the first leg 100 is then temporarily bent or flexed downward towards the body member 60 such that the first leg 100 can slide into the first aperture 120. This amount of bending of the first leg 100 is not sufficient to permanently deform the wire form member 40. That is, this bending of the wire form member 40 is classified as an elastic deformation and not an inelastic deformation. Also, note that in order for the first leg 100 to be able to be inserted through the first aperture 120 of the now partially-mounted blade member 80, the length of the first leg 100 cannot be too long it becomes impossible to align and then thread the first leg 100 through the first aperture 120 of the blade member 80. Ideally the first leg 100 is shorter than the second leg 140 in order to ensure that this STEP 3 and the following STEP 4 are always possible. In STEP 4, the blade member 80 is slid forward towards the eyelet portion 180 as the first leg 100 "springs back" or rebounds into its approximate beginning shape shown in STEP 5, and the "rebounding" first leg 100 helps push the blade member 80 forward until it is pivotably trapped on both the first leg 100 and second leg 140. Assembly is then complete, as the blade member 80 is pivotably and loosely constrained solely by the first leg 100 and second leg 140 each passing through the first aperture 120 and second aperture 160, respectively. It is important to note that the blade member 80 does not need to bend during installation onto the wire form member 40, and the blade member 80 touches or contacts the wire form member 40 only at two locations: the inner edge of the first aperture 120 and the inner edge of the second aperture 160. Reversing Steps 1-5 allows one to remove the blade member 80 for replacement, again without needing to try and bend the blade member 80 during any of such removal steps. Also, no additional arm or portion of the wire form member 40 is needed to support or rest against any part of the first side face 240 or opposite side face 280. Said differently, the wire form member 40 is desirably not capable of touching either the first side face 240 or opposite side face 280 of the blade member 80, as doing so can dampen the magnitude of the blade oscillations. For the sake of this invention, the first side face 240 and opposite side face 280 do not include the perimeter edges of the first aperture 120 and second aperture 160.

Figure 3:
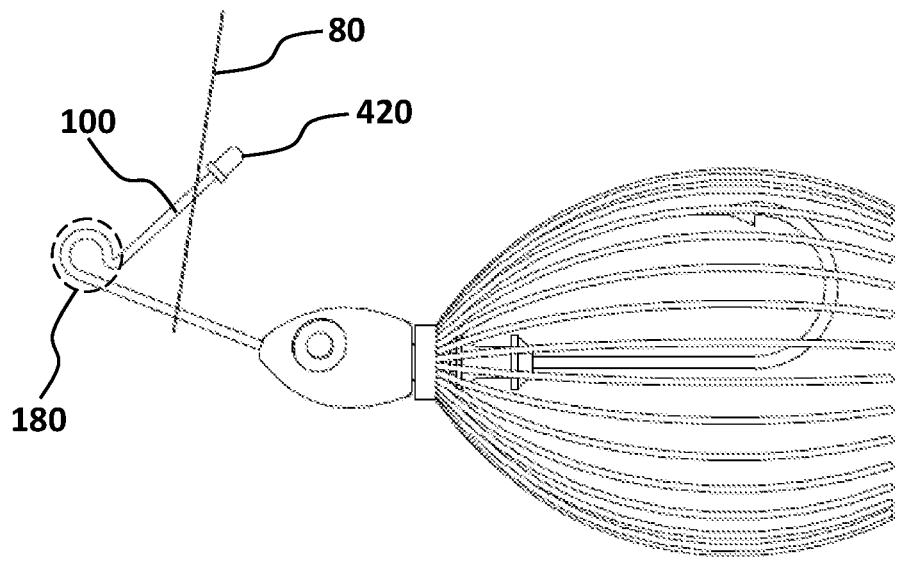
FIG. 3 is a diagrammatic side view of a second preferred embodiment of a lure with oscillating blade, wherein the first leg comprises no bends. A crimped-on cap or sleeve prevents a fish or angler from coming in contact with the sharp terminal end of the first leg.

FIG. 3 details an alternate preferred embodiment wherein the first leg 100 is substantially straight and contains no sharp bends between the eyelet portion 180 and the end of the first leg 100. A crimp-on cap 420 or rounded sleeve is attached onto the terminal end 320 to protect an angler from accidentally touching any sharp edges or burrs that might otherwise be present on the end of the first leg 100. In this embodiment, the cap 420 most likely would be crimped onto the first leg 100 as an additional step after the blade member 80 is fully assembled onto the wire form member 40. However, it is possible that with larger first and second apertures, the cap 420 could be crimped onto the end of the first leg 100 prior to sliding the blade member 80 onto the wire form member 40.

Figure 4:
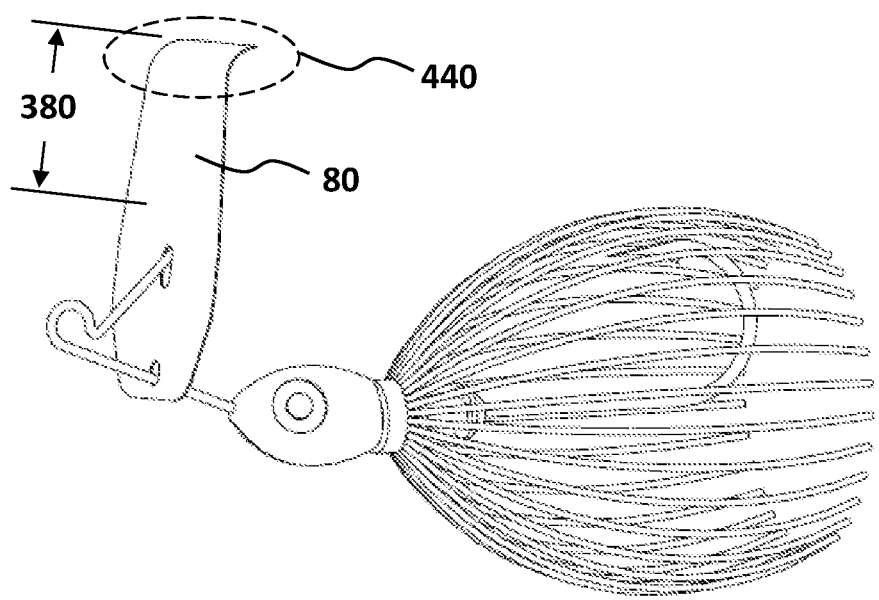
FIG. 4 is a diagrammatic perspective view of a third preferred embodiment of a lure with oscillating blade, wherein the top portion of the blade is curved slightly.

FIG. 4 shows a preferred embodiment wherein the upper half 380 of the blade member includes a curved portion 440. Such curvature can help the blade member 80 stay in a tilted-back orientation as it oscillates, which can help the lure stay deeper in the water during retrieval.

It should also be noted that for all embodiments, as the fishing line pulls the lure forward in water, the blade member oscillates or pivots from side to side while the lure itself remains in a generally upright orientation. No additional spinners or blades are needed in the construction of the lure in order to help stabilize the bait.

There are many obvious variations of the preferred embodiments described herein. The blade member can be made from a rigid plastic material in addition to a more common metallic material. The front or back surface of the blade member can be coated with plastic or metallic reflective elements, such as glitter, metallic paint, or similar. The surface of the blade member can comprise a hammered texture, a diamond-like pattern, or any other non-smooth texture or pattern designed to reflect and scatter light. At least one additional hole or aperture can be added to the blade member for generating bubbles or for changing its hydrodynamic resistance for a given blade size.

Although the wire frame is shown having a V-shape, it can also comprise a general U shape. Additionally, at least one spacer member can be slidably attached to the wire form member and be positioned either in front of or behind the blade member. A spacer member can be shaped similar to a disc, washer, ring, bead, tube, or sleeve. Loose spacer members can also act as rattle elements and generate underwater sounds as the blade and wire form member oscillate from side to side.

Although the hook is shown rigidly coupled to the body member in FIGS. 1A-4, the hook can also be loosely or pivotably coupled to the body member. Alternatively, the body member can be loosely or pivotably coupled to the wire form member.

The major features can be rearranged to create yet another embodiment of a lure with oscillating blade. The body member can be rigidly coupled to or merged with the bottom of the blade member instead of merged with the wire form member, with the wire form member again passing through the first aperture and second aperture of the blade member. In this embodiment, the wire form member is then loosely coupled to the hook.

While certain preferred embodiments have been described and shown in the accompanying drawings, it is to be understood that such preferred embodiments are merely illustrative of, and not restrictive on, the broad invention. It is intended that the scope of the invention be defined by the following claims and their equivalents.

What is claimed is:
1. A fishing lure comprising:
   a body member;
   a wire form member having a first leg and a second leg and an eyelet portion therebetween, wherein said first leg can be divided into a generally straight section, a terminal end, and only one bend between said generally straight section and said terminal end, wherein said bend is in a direction towards said body member, wherein said second leg is rigidly coupled to said body member and extends to said eyelet portion;

a minimum eyelet gap defined as the shortest distance between said second leg and the beginning of said first leg within said eyelet portion;

a single rigid blade member having first side face and an opposite side face, said rigid blade member further comprising a first aperture and a second aperture, wherein said first leg passes through said first aperture and said second leg passes through said second aperture, wherein said first leg and said second leg are not capable of touching said first side face or said opposite side face of said rigid blade member;

a second aperture spacing distance defined as the minimum distance between the perimeter edge of said rigid blade member and the perimeter edge of said second aperture, wherein said second aperture spacing distance is generally less than said minimum eyelet gap; and wherein said rigid blade member oscillates from side to side and said body member remains generally upright as said lure is pulled forward in water.

2. The fishing lure in accordance with claim 1, further comprising a hook rigidly coupled or loosely coupled to said body member.

3. The fishing lure in accordance with claim 1, wherein at least one spacer member is attached to said wire form member.

4. The fishing lure in accordance with claim 1, wherein an end portion of said rigid blade member is curved.

5. The fishing lure in accordance with claim 1, wherein said first aperture is elongated in shape.

6. The fishing lure in accordance with claim 1, further comprising at least one additional aperture.

7. The fishing lure in accordance with claim 1, wherein said rigid blade member is made of metal.

8. A fishing lure comprising:
a body member;
a wire form member having a first leg and a second leg and an eyelet portion therebetween, wherein said first leg is generally straight and has a terminal end, wherein said second leg is rigidly coupled to said body member and extends to said eyelet portion;
a single rigid blade member having a first aperture and a second aperture, wherein said first leg passes through said first aperture and said second leg passes through said second aperture; and
wherein said rigid blade member oscillates from side to side and said body member remains generally upright as said lure is pulled forward by said eyelet portion.

9. The fishing lure in accordance with claim 8, further comprising a cap covering said terminal end.

10. The fishing lure in accordance with claim 8, further comprising a hook rigidly coupled or loosely coupled to said body member.

11. The fishing lure in accordance with claim 8, wherein at least one spacer member is attached to said wire form member.

12. The fishing lure in accordance with claim 8, wherein an end portion of said bladed member is curved.

13. The fishing lure in accordance with claim 8, wherein said rigid blade member is made of metal, plastic, or any combination thereof.

14. The fishing lure in accordance with claim 8, further comprising at least one additional aperture.

15. A method of producing a fishing lure with an oscillating blade, the method comprising:
providing a body member;
providing a wire form member having a first leg and a second leg and an eyelet portion therebetween, wherein said second leg is rigidly coupled to said body member and extends to said eyelet portion;
providing a single blade member having a first aperture and a second aperture;
inserting said first leg through said second aperture of said blade member, sliding said blade member down said first leg and past said eyelet portion and onto said second leg;
rotating said blade member about said second leg to align said first aperture behind said first leg;
bending said first leg momentarily in a direction towards said body member;
inserting said first leg through said first aperture of said blade member; and
pulling said blade member in a direction towards said eyelet portion until said first leg springs back to its approximate original orientation and said blade member is pivotably coupled to said wire form member through solely said first aperture and said second aperture, thereby enabling said blade member to oscillate from side-to-side as said lure is pulled forward in water.

16. The method of claim 15, further comprising attaching a hook rigidly or loosely to said body member.

17. The method of claim 15, further comprising attaching at least one spacer member to said wire form member.

18. The method of claim 15, wherein an end portion of said bladed member is curved.

19. The method of claim 15, wherein said blade member is made of rigid metal, rigid plastic, or any combination thereof.

20. The method of claim 15, wherein said blade member comprises at least one additional aperture.

* * * * *